May 25, 1954  H. B. DERI  2,679,622
CURVE FOLLOWER
Filed May 19, 1951  4 Sheets-Sheet 2
Fig 3
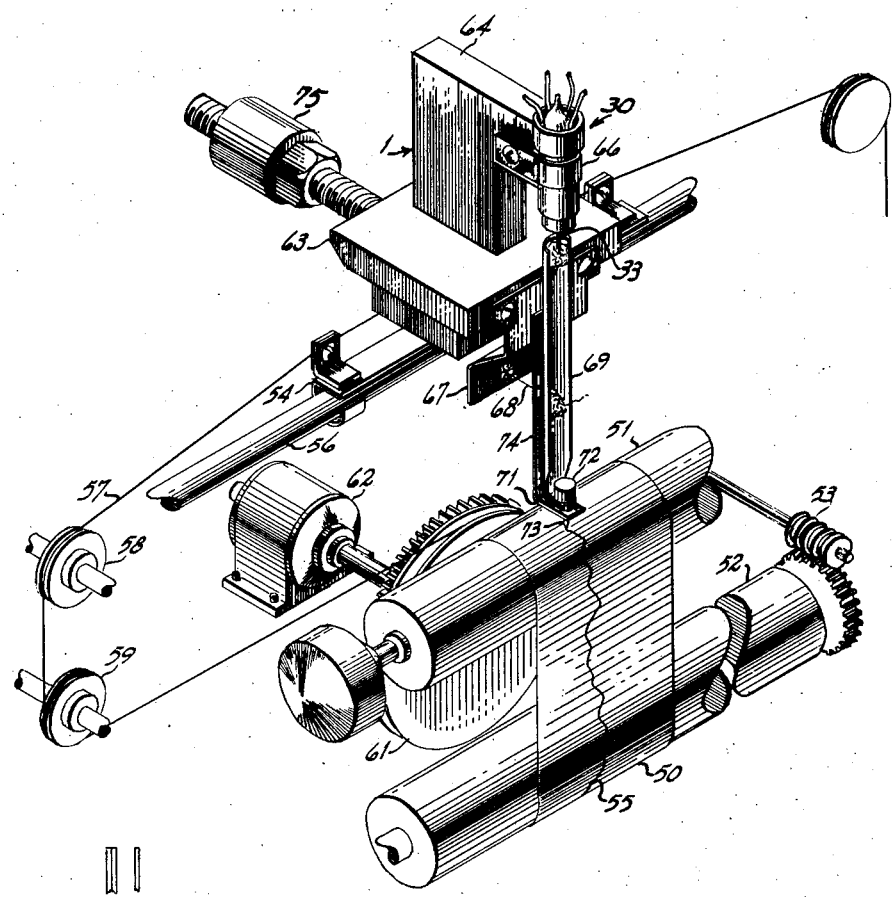
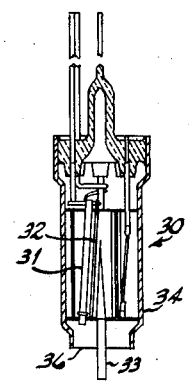
Fig 2a
INVENTOR.
HUBERT B. DERI
BY
H. S. Mackey
ATTORNEY.

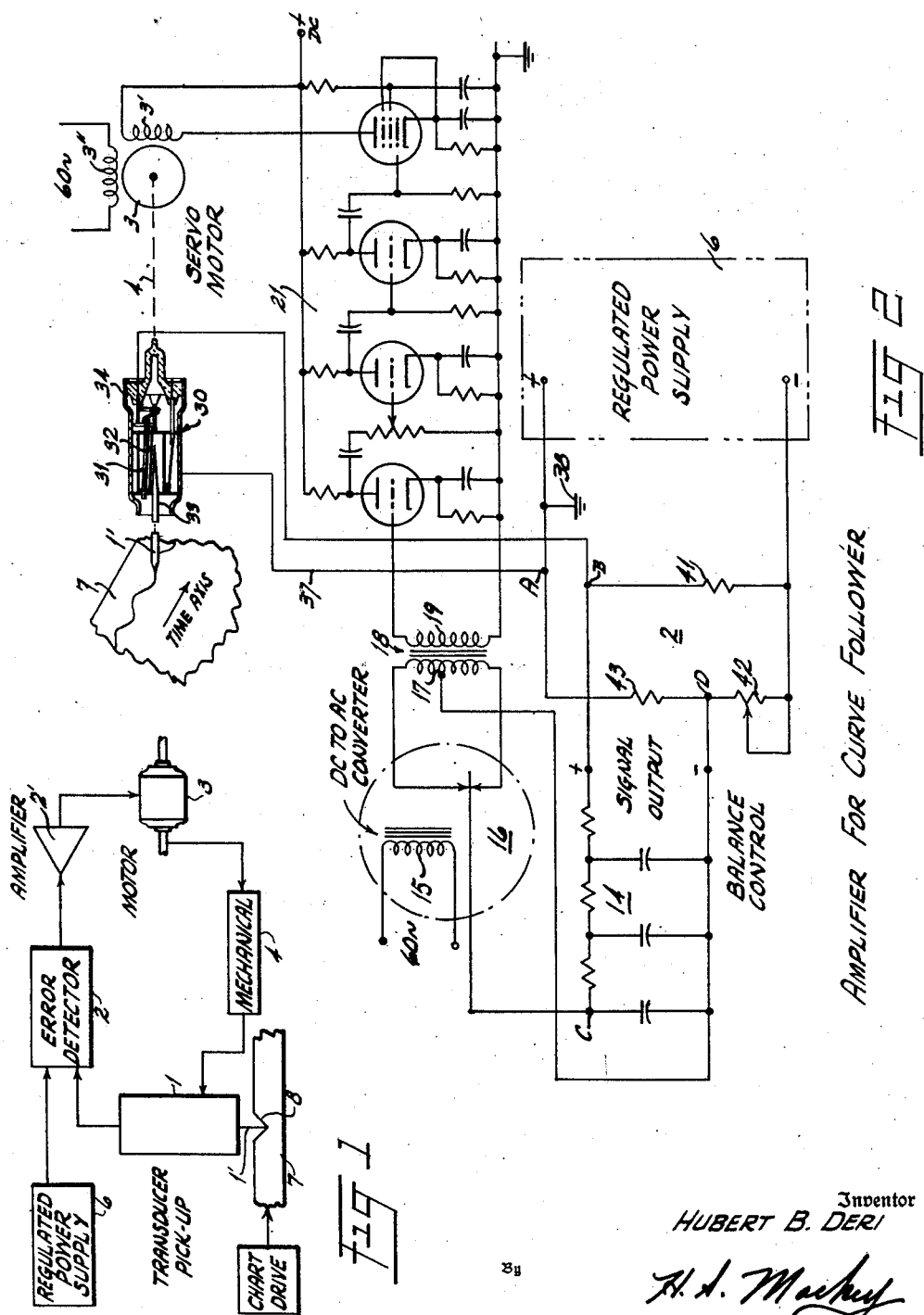

May 25, 1954  H. B. DERI  2,679,622
CURVE FOLLOWER
Filed May 19, 1951  4 Sheets-Sheet 3
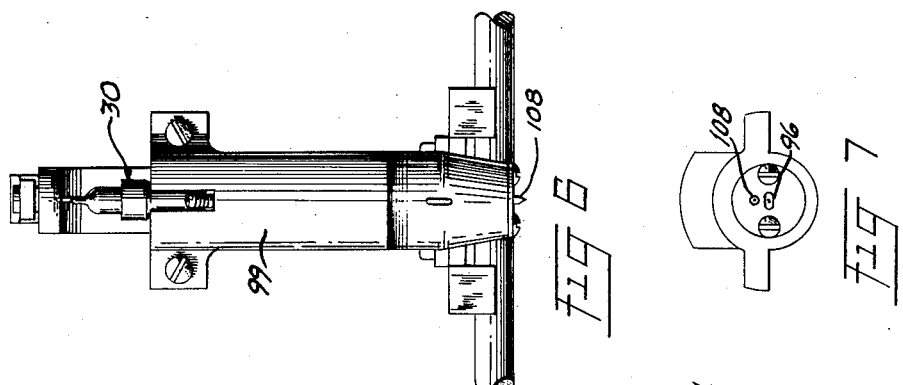
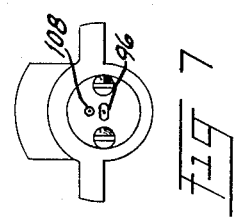
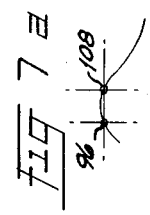
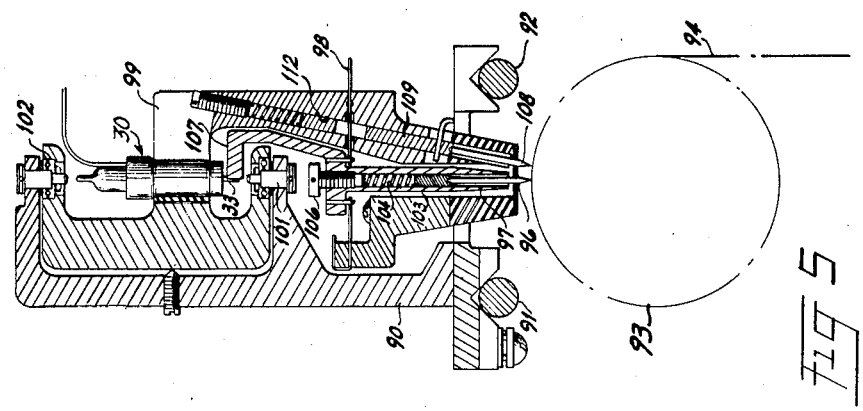
INVENTOR.
HUBERT B. DERI
BY
ATTORNEY

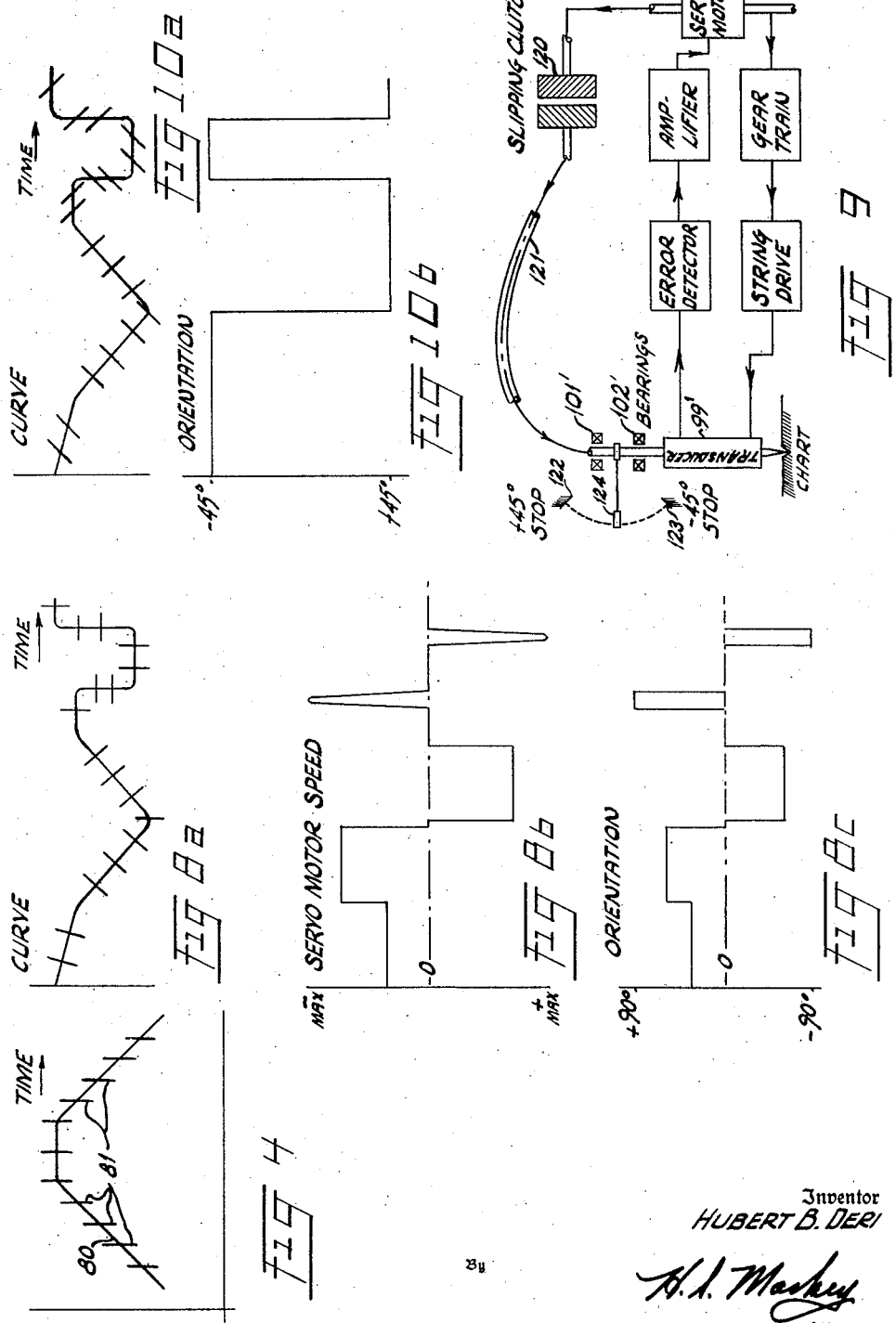

Patented May 25, 1954

2,679,622

UNITED STATES PATENT OFFICE 2,679,622

CURVE FOLLOWER

Hubert B. Deri, Rye, N. Y., assignor to General Precision Laboratory Incorporated, a corporation of New York Application May 19, 1951, Serial No. 227,229

4 Claims. (Cl. 318—31)

This invention relates to apparatus for recording, storing and reproducing information in the form of time functions.

Usually the power available to operate a recording instrument is very limited. Accordingly, considerable efforts have heretofore been made to develop devices for making accurate records of time functions, such as the variation of pressure, power, consumption of material, etc., with respect to time. As in all recording instruments, if the power necessary to operate the instrument is large compared to the quantity to be measured, an appreciable error must necessarily result. In order to avoid such errors and to change the measured quantities to mechanical motion without errors, it is necessary to utilize the limited quantity of energy available to operate some kind of multiplier wherein a separate and independent source furnishes energy for operating the recording or indicating mechanism. The problem in such a system arises in trying to operate a recording or indicating mechanism so that it will faithfully record and reproduce the time function. In such recording instruments it is necessary that the equipment cover a rather wide range of frequencies, particularly lower frequencies down to substantially direct current. Also in such recording and reproducing apparatus, it is necessary that an absolute minimum of force or power be required to operate the reproduction mechanism.

Accordingly, a primary object of the invention is to provide an improved apparatus for recording, storing and reproducing time functions that will overcome the difficulties mentioned.

Another object is to provide an improved apparatus for translating a time function into what might be called an endless and inexpensive cam, so that the function can be used to control apparatus, such as machine tools, assembly lines and the like.

Another object is to provide a continuous record of a time function which may constitute a component of a programming system for automatically correlating contemporaneous movements of devices and apparatus, such as those associated with assembly line or machine operations.

Another object is to provide such an endless cam of the type mentioned above which may be easily and cheaply reproduced and at the same time can be easily stored and filed.

A further object is to provide an improved apparatus which may be used for generating any desired time function.

A still further object is to provide a long-time-delay or a nonlinear circuit element.

A still further object is to provide improved recording and reproducing apparatus in which the stylus-carrying arm is adapted for a large range of movement, the movement of the arm being controlled by a vernier pivotal movement of the stylus, mounted so that the plane of deflection is variable to accommodate changes of slope of the function.

Other and further objects will become readily apparent from the following description when considered in connection with the accompanying drawings, in which:

Figure 1 is a schematic circuit diagram of improved apparatus made in accordance with the present invention;

Figure 2 is a complete circuit diagram of one embodiment of the present invention;

Figure 2a is a vertical sectional view of the electron discharge tube type of sensitive element of the transducer;

Figure 3 is a partial isometric view of the basic components of the reproducing apparatus;

Figure 4 is a graphical representation of the plane of deflection of the reproducing stylus with respect to the direction of the curve representing a time function reproduced by the apparatus shown in Fig. 3;

Figure 5 is a partial vertical sectional of a modified form of the invention.

Figure 6 is a front view of Fig. 5;

Figure 7 is a bottom plan view of Fig. 6;

Figure 7a is a representation of the relation of the orientation of the stylus mounting of Figs. 5 and 6 with respect to the record groove;

Figure 8a is a graphical representation of the relation between the plane of deflection of the record stylus and the curve representing the time function for the embodiment of Figs. 5, 6, and 7.

Figure 8b is a graphical representation of the time function of the servomotor speed for the same embodiment;

Figure 8c is a graphical representation of the orientation or position of the stylus head or mounting for the same embodiment;

Figure 9 is a schematic illustration of a third embodiment of the present invention;

Figure 10a is a graphical representation of the relation between the plane of deflection of the stylus and the direction of the curve of the time function for the embodiment of Fig. 9; and Figure 10b is a graphical representation of the orientation of the stylus mounting with respect to the time axis.

Broadly speaking, the present invention comprises a transducer device 1 having a stylus 1' whose movement is capable of producing an error signal, an error detector circuit 2 including an appropriate amplifier 2', a servomotor 3 responsive to the amplified error signal, a mechanical connection 4 between the servomotor 3 and the transducer 1 for adjusting the position of the transducer in response to an error signal for the purpose of neutralizing the error signal. Since the acceleration of the stylus is usually very small, the casing of the transducer 1 must be temporarily immobile by reason of friction or suitable non-reversible gearing so that relative movement of the stylus with respect to the casing will produce an error signal which will cause adjustment of the casing to reduce the error signal to zero. With this basic system any slight lateral movement of the stylus 1' of the transducer 1 as a result of variation in the relative position of the groove 8 in a recording medium, such as a plastic chart 7, which is moved in a fixed path will generate a slight error signal. This error signal will be detected and amplified and supplied to the motor 3, which through the mechanical connection 4, is adapted to move the mounting of the transducer 1 to reduce the error signal to zero. In this way, it will be noted that it is not necessary that the stylus 1' be moved a large amount, it being necessary only that a slight movement relative to the stylus mounting cause the unbalance of an electrical bridge circuit to actuate the motor.

The basic operation of the system will be more clearly understood from Fig. 2. The sensitive element of the transducer 1 is connected across the input terminals represented by the points A and B of a comparison or detector bridge circuit 2. As shown in Fig. 2a the sensitive element of the transducer 1 is a special three element electron discharge tube 30.

From the output from the error detector circuit 2, represented by the points B and D, a D.-C. potential is supplied through suitable filter circuit 14 to an inverter or chopper 16. The inverter 16 has an energizing coil 15, energized by a suitable source of alternating current, for example, 60 cycles. As clearly shown in the drawing, the inverter 16 alternately connects the opposite ends of the center-tapped primary 17 of a transformer 18 to the D.-C. output from the points C and D of the error detector circuit. The alternating current output from the secondary 19 is amplified in a suitable power amplifier 21, the output of which is supplied to the variable phase 3' of the two phase servomotor 3. The fixed phase 3" of the motor 3 may be supplied by any suitable source of constant frequency supply, preferably having a frequency the same as that frequency which energizes the vibrator inverter 16.

Referring to Fig. 2a, the sensitive element of the transducer 1 comprises an electron discharge tube 30 having a cathode 31, a grid 32 and a plate 33 in the form of a movable tapered shaft. The grid 32 is operated at zero bias, it being connected directly to the cathode 31. The lower end of the plate shaft 33 is mechanically connected to the transcribing stylus 1'; the upper end of the plate shaft 33 being movable relative to the cathode 31 and the grid 32 by reason of its pivotal mounting in a flexible diaphragm 36 which closes the lower end of a metal casing 34, which casing also constitutes the supporting means for the electron tube 30. Because this casing 34 is electrically connected to the plate shaft 33 it is desirable to maintain it at ground potential. It will be seen that the casing 34 is connected through conductor 37 to the grounded side of the regulated power supply 6, ground being indicated at 38.

The error detector circuit 2 comprises a Wheatstone type electrical bridge, the respective arms of which are represented by the resistors 41, 42, and 43 and the internal resistance of the electron discharge tube 30. It will be clearly understood that relative movement between the upper end of the plate shaft 33 with respect to the cathode 31 and grid 32 will vary the internal resistance of this tube. This variation in resistance will cause an unbalance of the bridge circuit 2, thereby causing the servomotor 3 to move the transducer 1 in the proper direction until the stylus 1' returns the upper end of the plate 33 shaft to its normal position where the bridge circuit 2 again becomes balanced, thus stopping the servomotor 3.

One specific arrangement for utilizing the transducer previously described in connection with a curve following mechanism is shown in Fig. 3. A suitable recording medium 50, which may be in the form of a plastic strip, bearing a record in the form of a groove 55, is adapted to be unwound from one platen roller 51 onto a second platen roller 52, it being understood that the roller 52 would be driven by any suitable motor means (not shown) through the gearing 53. The transducer 1 is mounted on a suitable carriage 54 adapted for sliding movement along a rail 56 which is parallel to the axis of the rollers 51 and 52. Suitable means for moving the carriage 54 longitudinally of the rail 56 is provided in the form of a flexible stranded wire 57 adapted to engage pulleys 58 and 59, the wire 57 being wound around a drum 61 operated by a motor 62, all in accordance with conventional practice. This means for moving the carriage in a direction parallel to the axis of the rollers 51 and 52 is a specific embodiment of that generally indicated in Fig. 1 by the reference numeral 4. Also the motor 62 in the specific example of Fig. 3 corresponds to the servomotor 3 referred to in Figs. 1 and 2.

The carriage 54 is provided with a suitable platform 63 which carries an upstanding block 64 to which the electron discharge tube 30 is held by means of a suitable clamp 66. Depending from the platform 63 is a bracket 67 to which a constraining wire 68 is attached, which wire restrains the deflection of the stylus arm 69 to a prescribed plane parallel to the axis of platens 51 and 52 and normal to the record 50. The upper end of the stylus arm 69 is connected in a suitable manner by means of soft solder to the projecting end of plate shaft 33. The lower end of the stylus arm 69 is provided with a flat horizontally extending portion 71 to which is attached a stylus chuck 72. The stylus is shown at 73 and extends through a hole in the lower end of a horizontal extension of a depending bracket 74. The bracket 74 is attached to the depending bracket 67. The hole in the horizontal portion of the bracket 74 is for the purpose of limiting the pivotal deflection of the stylus 73. This is necessary because the plate shaft 33 can accommodate movements of only a few thousandths of an inch. An adjustable counterweight 75 is provided to control the pressure with which the stylus 73 engages the record medium 50.

In the embodiment of the invention already described, the movement of the record medium is along the X-axis which is used as the time axis and the movement of the transducer carriage is along the coordinate axis at right angles thereto, that is, the Y-axis. It has been found that as a practical matter, the stylus can follow a mechanical record groove which does not make an angle greater than approximately 45 degrees with the plane of pivotal deflection. Accordingly, in the embodiment shown in Fig. 3 with the stylus 73 mounted for pivotal movement in a plane at right angles to the X-axis the stylus 73 can follow curves of any slope between positive and negative 45 degrees.

The graph of Fig. 4 illustrates a curve 80 having portions of positive and negative slope of 45 degrees, as well as a horizontal portion, the marks 81 representing the plane of pivotal deflection of the stylus 73. It is to be noted that the plane of deflection is fixed and therefore a single unit as shown in Fig. 3 could not accommodate curves having slopes steeper than approximately 45 degrees. However, it will be readily apparent that by using two such units, any function in the X—Y plane may be resolved into an X and a Y function, each related to an arbitrary parameter in such a way that the slopes of neither function will exceed plus or minus 45 degrees. The combined output of two curve followers operating simultaneously on these two functions may then represent functions having very steep slopes, or even multivalued functions. The outputs from the respective units may be combined electrically or mechanically and the appropriate conversion from mechanical to electrical force, or vice versa, can be made as desired.

In order to extend the range of slopes of curves which can be followed directly, the embodiment shown in Figs. 5, 6 and 7 is provided with means for automatically orienting the plane of deflection. To this end, the transducer carriage 90 is adapted for slidable movement on rails or bars 91 and 92, which are arranged parallel to the axis of the platen 93 over which the record medium 94 moves. This embodiment is distinguished from the previous embodiment in that the transcribing stylus 96 is mounted in a stylus chuck 97 pivotally mounted as at 98 to a frame 99 which in turn is pivotally mounted by means of anti-friction bearings 101 and 102 on the upper end of the transducer carriage 90. The normal neutral axis of the stylus 96 is coextensive with the axis of the anti-friction bearings 101 and 102. Accordingly, pivotal movement of the frame 99 in the bearings 101 and 102, will not cause any deflection of the stylus 96. As clearly shown in Fig. 5, the stylus 96 is adjustable vertically and is spring-biased to its lowermost position by means of the spring 104, a suitable adjusting screw 106 being provided for the purpose of preloading the spring 104.

A suitable stylus arm 107 is connected to the upper end of the stylus chuck 103, preferably integral therewith, and the upper end of the stylus arm 107 is provided with a notch which engages the lower end of the plate shaft 33 of the electron discharge tube 30. The stylus arm 107 and the chuck 103 are appropriately secured as by means of soft solder to the constraining wires 98 which are also secured to the frame 99 to constitute the pivotal connection 98 for the stylus arm. The constraining wires hold the chuck and stylus 96 in the normal neutral position when it is not deflected by the groove in the record medium.

A suitable guide stylus 108 is supported in a spring-pressed chuck 109 adapted to move within a bore 112 in the frame 99. The guide stylus 108 is adapted to engage the groove in the record medium at a point spaced about $\tfrac{1}{10}$ of an inch from the transcribing stylus 96. The cooperation of the transcribing stylus 96 and the guide stylus 108 with the groove 95 in the record medium 94 automatically orients the frame 99 thus maintaining the plane of deflection of the stylus at substantially right angles to a chord of the curve joining two points 96a and 108a on the curve engaged by the ends of the styli 96 and 108, respectively, as shown in Fig. 7a.

Fig. 8a illustrates the relative position of the plane of deflection of the stylus 96 with respect to the portions of the curve having positive, negative and zero slope, respectively. The plane of deflection is represented by the small marks crossing the curve. It is to be noted that the plane of deflection will be at substantially right angles to all portions of the curve, even where the slope is substantially infinite. Fig. 8b shows the speed of the servomotor 3 as a function of time while the styli 96 and 108 are following the curve of Fig. 8a. It will be readily recognized that the servomotor 3 necessarily has a maximum speed which will be reached when the curve has an infinite slope, either positive or negative. Fig. 8c shows the orientation of the plane of deflection as a function of time when the styli 96 and 108 are following the curve of Fig. 8a. It is evident that the stylus 96 can follow curves of infinite slope, provided, of course, that the servomotor is suitably designed for the required high speeds. It is conceivable that orientation of the deflection plane could be achieved electronically, if desired, or that it might be accomplished by a different type of mechanical means.

From the above it will be seen that in the embodiment of Figs. 5, 6 and 7 the plane of deflection is controlled by the average slope. In some instances, it may be preferable to provide an orientation of the plane of deflection which is a function of the tangent of the slope. One such mechanical arrangement is shown in Fig. 9, wherein an auxiliary mechanical drive including a slipping clutch is provided between the servomotor and the pivotally mounted frame which carries the curve tracing stylus.

In this embodiment, the transducer could be substantially identical to that shown in Figs. 5, 6, and 7, with the exception that the guide stylus 108 would be eliminated and a suitable mechanical conection would be provided for pivotally adjusting the frame 99' on the bearings 101' and 102'. In the arrangement shown schematically in Fig. 9, a suitable slipping clutch 120 is provided between the shaft of the motor 3 and a flexible drive shaft 121, which is adapted to be connected to the frame 99' of the transducer. Suitable stops 122 and 123 are adapted to limit the movement of an arm 124 carried by the frame 99'. It is to be noted that the two stops 122 and 123 are located approximately 90 degrees apart, one being 45 degrees on one side of the neutral point and the other being located 45 degrees on the opposite side thereof. With this arrangement the rotation of the shaft of the motor 3 would cause the frame 99' to be rotated therewith until it reached one of the stops 122 or 123, at which time the clutch 120 would slip permitting the motor to continue to operate if necessary. During such operation the actual pivotal movement of the frame 99' would correspond in direction to the direction of movement of the stylus carriage until the clutch 120 began to slip. The orientation of the plane of deflection is shown in the curve of Fig. 10a. It will be noted that the plane of deflection is at 45 degrees on one side of the neutral position for portions of the curve of negative slope and is at 45 degrees on the other side of neutral for positive slopes. For a horizontal portion of the curve, which horizontal portion immediately follows a positive slope of the curve, the plane of deflection will remain the same as it was during such preceding positive slope, that is, it will remain at substantially 45 degrees with respect to the time axis. Likewise, for any subsequent negative slope including infinity, the plane of deflection will be 45 degrees on the other side of the neutral position and then will remain unchanged over any immediately succeeding horizontal portion of the curve. Similarly for any subsequent positive slope of the curve including slopes to infinity, the plane of orientation will change by 90 degrees, assuming an angle of 45 degrees with the time axis but in the opposite direction. The position of the plane of orientation as a function of time is clearly shown in the graph of Fig. 10b.

From the foregoing description it will be seen that this invention provides an improved curve follower apparatus which is capable of following substantially any type of curve on a record medium and is adapted to control or modulate a source of power so that if desired, heavy machine elements could be controlled. The specific embodiment chosen for the purpose of illustrating the invention has numerous equivalents which could be substituted for those shown without departing from the scope of the invention. As previously mentioned, units are illustrated and described herein which can be used to follow a range of slopes and curves and one or more of these units may be operated in association to follow any single or mutivalued function plane curves. Also by extending this association between a number of units, it is possible to reproduce or generate three dimensional curves.

It is to be noted that the invention is primarily described in connection with a translating or curve following apparatus in which the servo used is of the type commonly referred to as a velocity servo, that is, the speed of the motor is proportional to the input electrical quantity or its mechanical equivalent. Similar equipment could be used for controlling the recording stylus during the forming of the record groove in the record medium. In the latter instance, a position servo mechanism would be used so that the movement of the recording stylus would be directly proportional to the electrical or mechanical input, in accordance with conventional practice.

What is claimed is:

1. In combination, a record-receiving medium, a transducer having a transcribing stylus, means for supporting and moving said record-receiving medium in a predetermined direction to provide a time axis, means for supporting and moving said transducer in operative association with respect to said medium in directions normal to said time axis and parallel to the record surface, said latter means including a carriage having a subframe pivotally supported thereto about an axis normal to the record surface of said medium, said pivotal axis being coaxially aligned with the axis of said transcribing stylus, said transducer including a relatively movable sensitive element having a normal neutral position and operably connected with said transcribing stylus, means for controlling the pivotal disposition of said subframe so as to maintain the plane of deflection of said transcribing stylus within a range of 45 degrees on either side of the time axis, and control means responsive to the pivotal deflection of said sensitive element from its normal neutral position for controlling the coordinate relative movement between said transducer and said medium.

2. In combination, a recording-receiving medium, a transducer, means for supporting and moving a record-receiving medium in a predetermined direction to constitute a time axis means for supporting and moving said transducer relative to and in operative association with said medium in directions normal to said time axis, said latter means including a carriage adapted to move transversely of said time axis and parallel to the surface of said medium, said latter means having a subframe pivoted thereto about an axis normal to the transverse movement of said carriage, said transducer including a relatively movable sensitive element having a normal position, a transcribing stylus operatively connected with said sensitive element and having its axis aligned with the pivotal connection between said carriage and said subframe, a guide stylus carried by said subframe and having its terminus displaced from the axis of said transcribing stylus, said styli adapted to mechanically engage a record groove in said medium so that the cooperative action of said styli controls the pivotal disposition of said subframe and consequently the plane of deflection of said transcribing stylus and means responsive to the deviation of said sensitive element from its normal position for controlling the coordinate movement of said carriage and transducer relative to said medium.

3. In combination, a record-receiving medium, a transducer, means for supporting and moving said record-receiving medium in a predetermined direction to provide a time axis, means for supporting and moving said transducer in operative association with respect to said medium in directions normal to said time axis and parallel to the surface of said medium, said latter means including a carriage adapted for movement transversely of said time axis and a subframe pivotally mounted to said carriage, said transducer including a relatively movable sensitive element having a normal neutral position, a transcribing stylus operatively connected with said sensitive element and mounted for pivotal deflection movement in directions transversely of said time axis, a servomotor, means operated by said servomotor for moving said carriage transversely of the time axis, means operated by said servomotor for controlling the pivotal movement of said subframe within predetermined limits, and control means responsive to the deflection of said sensitive element from its normal neutral position for controlling the direction of movement of said servomotor.

4. In combination, a record receiving medium, a transducer, means for supporting and moving said record medium in a predetermined direction at a predetermined speed to provide a time axis, means for supporting said transducer for movement in directions transversely of the direction of movement of said record medium and parallel to the surface thereof, said supporting means including a carriage adapted for rectilinear movement transversely of said record, said transducer including a pivotal sensitive element having a normal neutral position, a transcribing stylus fixed to said sensitive element, the outer end of said stylus adapted to mechanically engage said medium and be pivotally deflected about a fulcrum point at said sensitive element, means responsive to the pivotal movement of said stylus and said sensitive element from its normal neutral position for controlling the rectilinear movement of said carriage, said latter means including an electrical comparison circuit, a servo motor responsive to the deviation of said sensitive element from its normal neutral position for controlling the direction of rotation of said servo motor for moving said carriage and the fulcrum point for restoring said sensitive element to its normal neutral position to thereby deenergize said control means.

References Cited in the file of this patent

UNITED STATES PATENTS

| Number | Name | Date |
| --- | --- | --- |
| 2,354,391 | McCourt | July 25, 1944 |
| 2,423,480 | Caldwell | July 8, 1947 |
| 2,434,854 | Junkins et al. | Jan. 20, 1948 |
| 2,470,244 | Fryklund | May 17, 1949 |
| 2,489,305 | McLennan | Nov. 29, 1949 |
| 2,499,178 | Berry et al. | Feb. 28, 1950 |
| 2,536,892 | Sinnett et al. | Jan. 2, 1951 |
| 2,557,824 | Hornfeck | June 19, 1951 |